United States Patent [19]
Nouvertné et al.

[11] 3,875,107
[45] Apr. 1, 1975

[54] FLAME-RESISTANT THERMOPLASTIC MOLDING COMPOSITIONS AND MOLDINGS MADE THEREFROM

[75] Inventors: Werner Nouvertné, Krefeld, Germany; Peter Rolf Müller, Coraopolis, Pa.; Günter Peilstöcker; Hugo Vernaleken, both of Krefeld, Germany

[73] Assignee: Bayer Aktiengesellschaft, Leverkusen, Germany

[22] Filed: Apr. 29, 1974

[21] Appl. No.: 465,023

Related U.S. Application Data

[62] Division of Ser. No. 293,195, Sept. 28, 1972, Pat. No. 3,845,007.

[30] Foreign Application Priority Data
Sept. 29, 1971 Germany............................ 2148598

[52] U.S. Cl...... 260/37 PC, 106/15 FP, 260/47 XA
[51] Int. Cl............................................ C08g 51/10
[58] Field of Search.................... 260/37 PC; 106/15

[56] References Cited
UNITED STATES PATENTS
3,062,781  11/1962  Bottenbruch et al................. 260/47
3,112,292  11/1963  Bottenbruch et al................. 260/47
3,817,907  6/1974   Muller et al. ................... 260/37 PC

OTHER PUBLICATIONS

Lyons, The Chemistry and Uses of Fire Retardants; Wiley–Interscience 1970; pp. 420–421, 439.

Hattori et al.; The Effects of Fiber Glass Reinforcement on the Flammability Properties of Thermoplastics; Plastic Design and Processing; August 1967; pp 28–30.

Primary Examiner—Lewis T. Jacobs
Attorney, Agent, or Firm—Lawrence S. Pope

[57] ABSTRACT

Highly flame-resistant thermoplastic molding compositions based on aromatic polycarbonates and including (1) small amounts of chlorine or bromine or alkali metal salts or nickel salts or of mixtures of chlorine or bromine and the salts and (2) small amounts of glass fibers. The molding compositions have good processability and high impact strength.

6 Claims, No Drawings

3,875,107

FLAME-RESISTANT THERMOPLASTIC MOLDING COMPOSITIONS AND MOLDINGS MADE THEREFROM

This is a division of application Ser. No. 293,195, filed Sept. 28, 1972 now U.S. Pat. No. 3,845,007.

BACKGROUND OF THE INVENTION

1. Field of the Invention

This invention relates to flame-resistant thermoplastic molding compositions and to articles made therefrom.

2. Description of the Prior Art

Various methods for reducing the flammability of aromatic carbonates from bis-hydroxy compounds are known.

It has not proved successful to add flameproofing additives which are known for other plastics, such as, for example, antimony trioxide, to high molecular thermoplastic carbonates of dihydric phenols, because the amount of such additives must be so great that the valuable properties of the polycarbonates are considerably impaired or the additives are incompatible with the polycarbonates or are unstable at the high processing temperatures of polycarbonates.

Additions of, for example, alkali or ammonium perfluoroalkane-sulphonates, preferably those with perfluorinated alkyl radicals with about 4–8 carbon atoms, which show good compatibility with the polycarbonates and are sufficiently heat-stable (according to German Offenlegungsschrift 1,930,257) have proved more successful. Small additions of these sulphonates, in amounts of about 0.01 to about 1 percent by weight, suffice to render the polycarbonates more flame-resistant.

However, it has been found that the flame-resistant properties of polycarbonates containing the added alkali or ammonium perfluoroalkane-sulphonates which have been mentioned in general do not yet suffice for practical requirements, and the grading, required for many instances of practical use, into a class of high non-flammability according to test methods, such as, for example, the burning test according to Underwriters' Laboratories, item 94, is not achieved.

It is particularly the dripping behavior of a chemical material on exposure to flames which is important in as much as in cases of fire thermoplastic compositions which burn with difficulty but drip while burning, ignite substances which burn easily and can thus become the cause of greater damage. However, it has not yet been possible to improve the dripping behavior of non-reinforced polycarbonates by the additions of sulfonates which have been described.

A similar situation applies when using additions of nickel compounds (in accordance with German Offenlegungsschrift 1,918,216).

Flame-resistant polycarbonates are hitherto preferentially manufactured in industry by incorporating halogen-containing divalent phenols, for example tetrachloro- or tetrabromo-bisphenols into the polymeric molecule. The high halogen content which is required for grading in a category of high fire resistance, for example SE 1 according to Underwriters' Laboratories, item 94, can, however, have adverse effects. (Compare U.S. Pat. No. 3,334,154). This is because the high halogen content causes a worsening of the processability of the polycarbonates in question, which manifests itself in diminished flow properties and reduced heat stability of these polycarbonates.

Glass fiber-reinforced aromatic polycarbonates of bis-hydroxy compounds, with a glass fiber content of 20 – 30 percent by weight, have proven to be of value in practical use, since the glass fiber reinforcement produces an improvement, relative to the non-reinforced polycarbonate, in a series of important properties such as, for example, the modulus of elasticity and the flexural strength.

While in most other thermoplastic materials such as, for example, polyamides, the glass fiber reinforcement reduces their flame resistance, the flame-resistant properties of polycarbonates are improved by adding preferably 20 – 30 percent by weight of glass fibers.

Admittedly, the addition of glass fibers, in the amounts mentioned, to aromatic polycarbonates causes an embrittlement of the thermoplastic molding composition and a substantial reduction in the impact strength as compared to the non-reinforced material. Hence glass fiber additions of 20 – 30 percent by weight, such as are used for reinforcing aromatic polycarbonates from bis-hydroxy compounds and for manufacturing dimensionally stiff thermoplastic molding compositions, are unsuitable for the manufacture of flameproof polycarbonates having a high impact strength. On the other hand, glass fiber contents of less than 10 percent by weight when used as additives to aromatic polycarbonates do not produce any improvements in the fire resistance.

SUMMARY OF THE INVENTION

It has now been found, in accordance with this invention, that the high flame-resistant categories desired of polycarbonate molding composition, such as the SE 1 and SE 0 classifications of Underwriters' Laboratories, item 94, are achieved without appreciable effect on the processability or impact strength of the compositions by incorporating into the compositions (1) small amounts of chlorine or bromine or of alkali metal salts or nickel salts or of both the halogen and the salts and (2) small amounts of glass fibers.

The dramatic effect of the combination of glass fibers with halogen and or with salts is surprising because the amount of halogen or salts is, alone, generally not sufficient, in any case less sufficient to produce an SE 1 or SE 0 flame-resistant polycarbonate composition and the small amount of glass fibers would not be expected to improve the flame-resistant properties of the polycarbonate compositions.

DETAILED DESCRIPTION

The flame-resistant thermoplastic molding compositions and articles provided according to this invention comprise, with the percentages given being by weight based on the total weight of the molding compositions:

a. from about 93 to 98 percent of an aromatic polycarbonate;

b. an effective amount of
 i. up to about 3 percent of chlorine or bromine, or
 ii. up to about 1 percent of alkali metal salts or nickel salts preferably those salts soluble in the aromatic polycarbonate, or
 iii. mixtures of i and ii; and c. 2–6 percent glass fibers.

The chlorine or bromine is chemically bonded to an aromatic carbon atom and may be incorporated into the flame-resistant polycarbonate molding compositions in the form of halogen-containing aromatic polycarbonates based on tetrachloro- or tetrabromo-bisphenol A-polycarbonates. The polycarbonates may be halogen-containing copolycarbonates alone or halogen-containing polycarbonate homopolymers or copolymers mixed with halogen-free polycarbonates.

The chlorine or bromine is incorporated into the polycarbonate molding composition in amounts up to 3 per cent by weight, and preferably 1.5 to 2.5 percent by weight, but if no flame-proofing additive is present, the chlorine or bromine should be at least 1 per cent by weight of the molding composition.

The alkali metal salts or nickel salts are incorporated into the polycarbonate molding compositions in amounts up to 1 percent by weight, and preferably 0.05 – 0.2 percent but if no halogen is present, the flame-proofing additive should be at least 0.01 per cent by weight of the molding composition.

It should be noted that the amount of (1) chlorine or bromine and (2) the alkali metal salt or nickel salt used when both (1) and (2) are present may be less than the amount required for each when one of them is not present in the composition. The amount of (1) and (2) needed in a mixture of (1) and (2) is that which will produce an SE 2 (explained below) polycarbonate material when no glass fiber is present in the composition.

The glass fibers are incorporated into the polycarbonate molding compositions in amounts of from about 2 to 6% by weight and, preferably, about 4% by weight. The glass fibers useful in the invention have average fiber lengths of 100 to 600 $\mu$m and, preferably, 200-400 $\mu$m.

A particularly surprising fact is that even low viscosity polycarbonate, which flows easily and which tends to drip to an increased extent, can be employed for the manufacture of the thermoplastic molding composition according to the invention, with the additives according to the invention preventing both a reduction in the smoldering times and also the undesirable dripping.

Because of the low glass fiber content, the high impact strength which is demanded in many cases of practical use and is valued in aromatic polycarbonates from bisphenol A is not worsened to any significant extent.

The small amounts of salts, flameproofing additives, and the small added amounts of halogen also do not cause any decrease in the impact strength which high impact strength is characteristic of polycarbonate.

The processability of the thermoplastic molding composition of polycarbonate is likewise not impaired to any significant extent by the small halogen content and glass fiber content according to the invention.

Polycarbonates that may be used in the composition of the invention, include those derived from aromatic bis-hydroxy compounds, and in particular, for example, those manufactured from dihydric phenols, such as resorcinol, hydroquinone or dihydroxydiphenyl, from bis-(hyroxyphenyl)-alkanes, such as, for example, bis-(4-hydroxyphenyl)-propane-2,2, from trinuclear bis-phenols such as α,α'-bis-(4-hydroxyphenyl)-p-diisopropylbenzene, from halogenated bis-(hydroxyphenyl)-alkanes, such as, for example, 4,4'-dihydroxy-3,5,3',5'-tetrachloro-phenylpropane-2,2 or 4,4'-dihydroxy-3,5,3',5'-tetrabromo-phenylpropane-2,2, bis-(hydroxyphenyl)-cycloalkanes, -sulphones, -sulphoxides, -ethers and -sulphides, optionally mixed with glycols, with derivatives of carbonic acid, for example its diesters or dihalides, optionally with the conjoint use of minor amounts of dicarboxylic acids or their derivatives which are suitable for the formation of an ester, and which possess an average molecular weight of about 10,000 to 100,000, preferably between about 20,000 and 50,000.

Suitable halogen-containing aromatic polycarbonates are, for example, copolycarbonates based on tetrachloro- or tetrabromo-bisphenol-A and bisphenol-A or mixtures of halogen-free and halogen-containing polycarbonate or co-polycarbonate.

Possible glass fiber materials are all commercially available types of glass fibers, such as, for example, ground short glass fibers and rovings, but especially staple glass fiber, provided that they possess a fiber finish which is compatible with polycarbonate.

The additives to be used are the compounds which are known and suitable for the flameproofing of polycarbonate. Also useful are synergistically acting substances.

Examples of suitable compounds are alkali salts having an organic moiety, particularly those which are soluble in polycarbonate, and more particularly soluble alkali metal salts of organic carboxylic acids, preferably containing from 1 to 18 carbon atoms, and of perfluoroalkanesulfonic acid. Examples of these salts include potassium 2-ethyl-hexanate, sodium 2-ethyl-hexanate, lithium 2-ethyl-hexanate, potassium perfluorooctanate, sodium perfluorooctanate, lithium perfluorooctanate, potassium salts of 5-ethyl-dioxan-1,3-yl-(5)-carboxylic acid, rubidium 2-ethyl-hexanate, rubidium perfluorooctanate and potassium perfluoromethanesulfonate, potassium perfluorooctanesulfonate and potassium perfluorobutanesulfonate. Further examples of suitable salts are alkali salts of lauric acid, stearic acid, oleic acid, phthalic acid monobenzyl ester, adipic acid monobutyl ester, p-octylbenzoic acid, p-tert.-butyl-benzoic acid, 3-(3,5-di-tert.-butyl-4-hydroxyphenyl)-propionic acid and diglycollic acid mono-decyl ester.

Additionally, soluble nickel salts, for example the soluble nickel salts of 2-ethyl-hexanoic acid, of lauric acid and of stearic acid may be used.

The glass fiber materials, like the flameproofing additives and halogen-containing polycarbonates described, can be added to the polycarbonates in various ways. They can be added to the reaction mixtures before, during or after the manufacture of the polycarbonates. They can furthermore be added to polycarbonate solutions or polycarbonate melts. Finally, they can be mixed with polycarbonate granules and these mixtures can be homogenized by subsequent melt extrusion.

In the same manufacturing process it is possible to add to the polycarbonate, in addition to the additives according to the invention, further additives such as, for example, the pigments and effect substances suitable for coloring the polycarbonate, and also mold-release agents, stabilizers and anti-oxidants.

The surprising influence of the additive combination according to the invention on the fire resistance of aromatic polycarbonates based on bisphenol A, while retaining the impact strength characteristic of such polycarbonates, is illustrated by Tables 1 – 3. The undesired reduction in the impact strength caused by high amounts of glass fibers is recognizable. The flame-resistant polycarbonates according to the invention can be processed in the form of powders or granules, in accordance with the known processing methods, such as, for example, by injection molding or extrusion, to give moldings of the most diverse kind.

Molding compositions from the flame-resistant thermoplastic polycarbonates according to the invention, which contain the additives according to the invention, are suitable for the manufacture of impact-resistant moldings of low flammability such as are employed, for example, in general instrument construction, precision engineering, the electrical industry and telecommunication, and also for the manufacture of semi-finished goods, such as, for example, films, sheets, rods and profiles.

EXAMPLES

Tables 1, 2 and 3 contain Examples 1 to 20. Examples marked with an asterisk (*) do not relate to compositions of the invention and are included for comparison only.

In Tables 1 and 2 the results of flammability tests according to standards of Underwriters' Laboratories, item 94 (UL 94), and IBM 6-0430-102, are listed.

In the UL 94 test individual specimens of the dimension 1/16 × ½ × 5 inches are vertically clamped and exposed twice for 10 seconds each time to a blue gas flame of 20 mm height, the top of the gas burner is positioned about 10 mm from the lower end of a test specimen. The specimens are positioned 12 inches above a horizontal layer of absorbent surgical cotton. For classifying the material in a fire class, 5 test pieces in the injection-fresh and in the tempered state (tempering is carried out at 70°C for 7 days) are tested.

The following criteria are decisive for classification:

"SE 2"
| | |
|---|---|
| Average after-burning time: | ≦ 25 seconds |
| Maximal acceptable after-burning time after any one flame application: | 30 seconds |
| The material may drip off burning | |

"SE 1"
After burning times correspond to those of SE2 but material may not drip off burning.

"SE 0"
| | |
|---|---|
| Average after-burning time | ≦ 5 seconds |
| Maximal acceptable after-burning time: | 10 seconds |
| The material must not drip off burning | |

In the IBM 6-0430-102 test, test specimens measuring 120 × 10 × 4 mm are suspended vertically and exposed to a 2 cm high Bunsen burner flame (without an air supply). The distance of the top of the Bunsen burner is 1 cm from the bottom of the test specimen. The length of time is determined for which a test specimen can be exposed to the flame as described above without continuing to burn for longer than 30 seconds after removal of the flame, and without burning particles dripping off of the specimen and igniting a wad of cotton wool placed under the specimen. A material is classed as a Class A material if after a 60 second flame application time, the material will extinguish without producing flaming droplets. Class B materials are those that extinguish within 30 seconds after a 5 second or more flame application time but cannot withstand a 60 second flame application time without exceeding the foregoing. Thus, for example if a material extinguishes within 30 seconds for flame application times up to 45 seconds it is classified Class B/4 mm/45 sec.

In the examples the polycarbonates described (granulated) are dry mixed with the various amounts of flame proofing additive, e.g., in the form of the tetrachlorobisphenol A polycarbonate, or glass fibers by so-called tumbling. Thereafter, the granules are extruded at about 300° C., using a mixing screw, to give a ribbon that is then chopped to give granules. These granules are then converted into the required test sepcimens in an injection molding machine at about 300°C.

The halogen-free polycarbonate of bisphenol A employed in Examples 1–20 is the reaction product of bisphenol A and phosgene having a relative viscosity of 1.28 measured on solutions of 0.5 g of polycarbonate in 100 ml of methylene chloride at 25°C. It is prepared by introducing under nitrogen atmosphere, 1825 parts by weight of phosgene into a mixture of 3420 parts by weight of bisphenol A, 70.0 parts by weight of p-tert. butylphenol, 2100 parts by weight of a 45 per cent by weight aqueous sodium hydroxide solution, 17,500 parts by weight of distilled water and 33,000 parts by weight of methylene chloride at 24°–25°C. During the 10th and 90th minutes of the introduction period of phosgene further 1300 parts by weight of a 45 percent by weight aqueous sodium hydroxide solution are dropped in. After the introduction of the phosgene is finished 6 parts by weight of triethylamine are added and stirred further for an hour. Then the organic phase and the aqueous phase are separated. The organic phase is washed first with a 2 percent by weight aqueous phosphoric acid, second with a 2 percent by weight aqueous sodium hydroxide solution, third further two times with the 2 percent by weight phosphoric acid and finally with distilled water until the solution is neutral. Thereafter 7500 parts by weight of chlorobenzene is added to the methylene chloride solution and the main proportion of methylene is distilled off. After cooling the remaining mixture gells and the gel is chopped to small pieces which are dried at 120°C. under vacuum during 48 hours.

The polycarbonate of bisphenol A and tetrachlorobisphenol A employed in Examples 1–9 has a relative viscosity of 1.27 and contains 6.5 percent chlorine. This product is prepared by treating a mixture of 2.992 parts by weight of bisphenol A, 686 parts by weight of tetrachlorobisphenol A (2.2-bis-(3,5-dichloro-4-hydroxyphenol)-propane), 50 parts by weight of p-tert. butylphenol, 2850 parts by weight of a 45 percent by weight aqueous sodium hydroxide solution, 17,500 parts by weight of distilled water and 33,000 parts by weight of methylene chloride with phosgene and by working up the reaction product as described above for the halogen-free polycarbonate.

The polycarbonate of bisphenol A and tetrabromobisphenol A employed in Examples 10 – 16 has a relative viscosity of 1.293 and contains 6 percent bromine. This product is prepared by reacting 3246 parts by weight bisphenol A, 414 parts by weight of tetrabromobisphenol A, 54 parts by weight of p-tert.-butylphenol, 4300 parts by weight of 45 percent by weight of sodium hydroxide solution with the parts by weight of the remaining compounds set forth above for the tetrachlorobisphenol A-polycarbonate; the reaction product is worked up as described above for the halogenfree polycarbonate of bisphenol A.

The other copolycarbonates mentioned therein are prepared accordingly.

Table 1

Optimizing the fire resistance, while retaining the impact strength of polycarbonates based on bisphenol A, by adding chlorine in the form of tetrachlorobisphenol-A-polycarbonate and/or glass fibers.

| | Chlorine content in % by weight | Glass fiber content in % by weight | Burning test in accordance with Underwriters' Laboratories Inc +) | | | IBM subj. CMH 6-0430-102 | Impact strength++) according to DIN 53 453 cmkp/cm² |
|---|---|---|---|---|---|---|---|
| | | | Average smoldering time in seconds | Number of burning samples which have dripped | Classification | | |
| 1* | — | — | >25 | 20 | not self-extinguishing | Cl. B 4 mm/10 secs | did not break |
| 2* | — | 20 | 7 | 0 | SE I | Cl. A 4 mm/60 secs | 49 |
| 3* | — | 4 | >25 | 15 | not self-extinguishing | Cl. B 4 mm/15 secs | did not break |
| 4* | 4.5 | — | 10 | 7 | SE II | Cl. B 4 mm/20 secs | did not break |
| 5* | 4.5 | 4 | 6 | 0 | SE I | Cl. A 4 mm/60 secs | did not break |
| 6* | 4.5 | 6 | 3 | 0 | SE 0 | Cl. A 4 mm/60 secs | 93 |
| 7* | 2.25 | — | 20 | 12 | not self-extinguishing | Cl. B 4 mm/20 secs | did not break |
| 8 | 2.25 | 3 | 11 | 0 | SE I | Cl. B 4 mm/30 secs | did not break |
| 9 | 2.25 | 4.5 | 4 | 0 | SE 0 | Cl. A 4 mm/60 secs | did not break |

+) 20 flame exposures were carried out in each case
++) 10 samples were tested in each case Table 2

Optimizing the fire resistance, while retaining the impact strength of polycarbonates based on bisphenol A, by adding bromine in the form of tetrabromobisphenol-A-polycarbonate and/or glass fibers.

| | Bromine content in % by weight | Glass fiber content in % by weight | Burning test in accordance with Underwriters' Laboratories Inc+) | | | IBM subj. CMH 6-0430-102 | Impact Strength++) according to DIN 53 453 cmkp/cm² |
|---|---|---|---|---|---|---|---|
| | | | Average smoldering time in seconds | Number of burning samples which have dripped | Classification | | |
| 10* | — | — | >25 | 20 | not self-extinguishing | Cl. B 4 mm/10 secs | did not break |
| 11* | — | 20 | 7 | 0 | SE I | Cl. A 4 mm/60 secs | 49 |
| 12* | — | 4 | >25 | 15 | not self-extinguishing | Cl. B 4 mm/15 secs | did not break |
| 13* | 6 | — | 8 | 5 | SE II | Cl. B 4 mm/45 secs | did not break |
| 14* | 6 | 5 | 2 | 0 | SE 0 | Cl. A 4 mm/60 secs | did not break |
| 15* | 3 | — | 8 | 9 | SE II | Cl. B 4 mm/40 secs | did not break |
| 16 | 3 | 4 | 2 | 0 | SE 0 | Cl. A 4 mm/60 secs | did not break |

+) 20 flame exposures were carried out in each case
++) 10 samples were tested in each case Table 3

Optimizing the fire resistance while retaining the impact strength of polycarbonates based on bisphenol A by adding flameproofing additives and/or glass fibers.

| | Additive content (K perfluoro-octanesulphonate) in % by weight | Glass fiber content in % by weight | Burning test in accordance with Underwriters' Laboratories Inc.+) | | | Impact strength++) according to DIN 53 453 cmkp/cm³ |
|---|---|---|---|---|---|---|
| | | | Average smoldering time in seconds | Number of burning samples which have dripped | Classification | |
| 17* | 0.1 | — | 5 | 6 | SE II | did not break |
| 18* | — | 20 | 7 | 0 | SE I | 49 |
| 19* | — | 5 | 6 | 2 | SE II | did not break |
| 20 | 0.1 | 5 | 4 | 0 | SE 0 | did not break |

+) 20 flame exposures were carried out in each case
++) 10 samples were tested in each case

EXAMPLE 21

0.1 percent by weight of potassium perfluorobutane-sulfonate and 5 percent by weight of glass fibers of average length 400 μm were incorporated into a copolycondensate of bisphenol A and tetrachlorobisphenol A containing 0.9 percent by weight of chlorine to give a molding composition. Appropriate test rods from the molding composition thus obtained conform to Class 1 of the fire test according to Underwriters' Laboratories, subject 94, and are rated Class B/4 mm/45 secs. according to IBM Fire Test Subject CMH 6-0430-102. Test specimens corresponding to the standard specification do not break in the impact test according to DIN 53,453.

EXAMPLE 22

0.2 percent by weight of potassium isooctanate and 6 percent by weight of glass fibers of average length 110 μm are mixed into the polycarbonate of bisphenol A to give a molding composition. Appropriate test specimens of the molding composition thus obtained conform to Class 1 of the fire test according to Underwriters' Laboratories, subject 94, and are rated Class B/4 mm/40 secs. according to IBM Fire Test Subject CMH 6-0430-102. Some of the test specimens break in the impact test according to DIN 53,453 while the rest do not break.

EXAMPLE 23

0.5 percent by weight of nickel laurate and 4 per cent by weight of glass fibers of average length 400 μm are mixed into the polycarbonate from bisphenol A to give a molding composition. Appropriate test specimens of the molding composition thus obtained conform to Class 1 of the fire test according to Underwriters' Laboratories, and are rated Class B/4 mm/45 secs. according to IBM, Subject CMH 6-0430-102. Test specimens corresponding to the standard specification do not break in the impact test according to DIN 53,453.

EXAMPLE 24

2 percent by weight of glass fibers of average length 400 μm are mixed into a copolycondensate of bisphenol A, tetrachlorobisphenol A and dihydroxydiphenylsulfone containing 2.25 percent by weight of chlorine and 0.2 percent by weight of sulfur and prepared by known methods. Appropriate test specimens of the molding composition thus obtained conform to Class 0 of the first test according to Underwriters' Laboratories, subject 94, and are rated Class A/4 mm/60 secs. according to IBM, Subject CMH 6-0430-102. Test specimens corresponding to the standard specification do not break in the impact test according to DIN 53,453.

EXAMPLE 25

0.1 percent by weight of sodium perfluorooctanate and 4 percent of glass fibers of average length 400 μm are mixed into the polycarbonate from bisphenol A to give a molding composition. Appropriate test specimens of the molding composition thus obtained conform to Class 1 of the fire test according to Underwriters' Laboratories, subject 94, and are rated Class B/4 mm/40 secs. according to IBM, Subject CMH 6-0430-102. Test specimens corresponding to the standard specification do not break in the impact test according to DIN 53,453.

EXAMPLE 26

0.05 percent by weight of potassium perfluorooctane-sulfonate and 5 percent by weight of glass fibers of average length 550 μm are added to a polycarbonate from bisphenol A to give a molding composition. Appropriate test specimens of the molding composition thus obtained conform to Class 1 of the fire test according to Underwriters' Laboratories, subject 94, and are rated Class B/4 mm/40 secs. according to IBM, Subject CMH 6-0430-102. Test specimens according to the standard specification do not break in the impact test according to DIN 53,453.

Thus from the examples it is seen that the molding compositions of the invention exhibit unexpected flame-retardant or flame-resistant properties but still retain a high impact strength and good processability.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A high impact, flame resistant aromatic polycarbonate containing by weight:
    a. 2–6 percent glass fibers having an average fiber length of 100 to 600 μm; and
    b. an effective amount of
        i. up to 3 percent of chlorine or bromine chemically bonded to an aromatic carbon atom of said aromatic polycarbonate, and
        ii. up to 1 percent of an alkali metal salt.

2. The aromatic polycarbonate of claim 1 wherein said alkali metal salt is soluble in said aromatic polycarbonate.

3. The aromatic polycarbonate of claim 1 wherein i is present in an amount of 1 to 3 percent, and ii is present in an amount of about 0.01 to 1 percent.

4. The aromatic polycarbonate of claim 1 wherein said chlorine or bromine is present in an amount of from 1.5 to 2.5 percent.

5. The aromatic polycarbonate of claim 3 wherein said alkali metal salt is present in an amount of from 0.05 to 0.2 percent.

6. Articles molded from the composition of claim 1.

* * * * *